DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 14

T947,009

METHOD FOR RELEASING ADHESIVE-BACKED EMBLEMS, LABELS AND THE LIKE FROM SUBSTRATES USING A CHEMICAL RELEASE AGENT

Robert L. Ammons, 2237 Charsley Road, Kingsport, Tenn. 37660

Filed Feb. 24, 1975, Ser. No. 552,478

Int. Cl. B08b *3/08;* B32b *35/00;* C11d *7/50;* D01f *11/00*

U.S. Cl. 156—344

No Drawing. 10 Pages Specification

Method for releasing polyester, polyamide, polyurethane, polyvinyl chloride adhesive-backed emblems, labels, and seam joinings, and cyclic trimer polymer deposits from substrates by applying thereto gamma-butyrolactone in an amount sufficient to wet the emblems, labels, seam joinings and polymer deposits. Gamma-butyrolactone may be used alone or at least 25% by volume in solution with water, or at least 25% by volume in solution with perchloroethylene, water and a surfactant, or at least 25% by volume in solution with a petroleum solvent, water and a surfactant, and at a preferred temperature of 70° F. to 175° F.